June 30, 1953  A. E. GAUDREAU  2,643,563
SCREW-OPERATED VISE CONSTRUCTION
Filed April 7, 1950
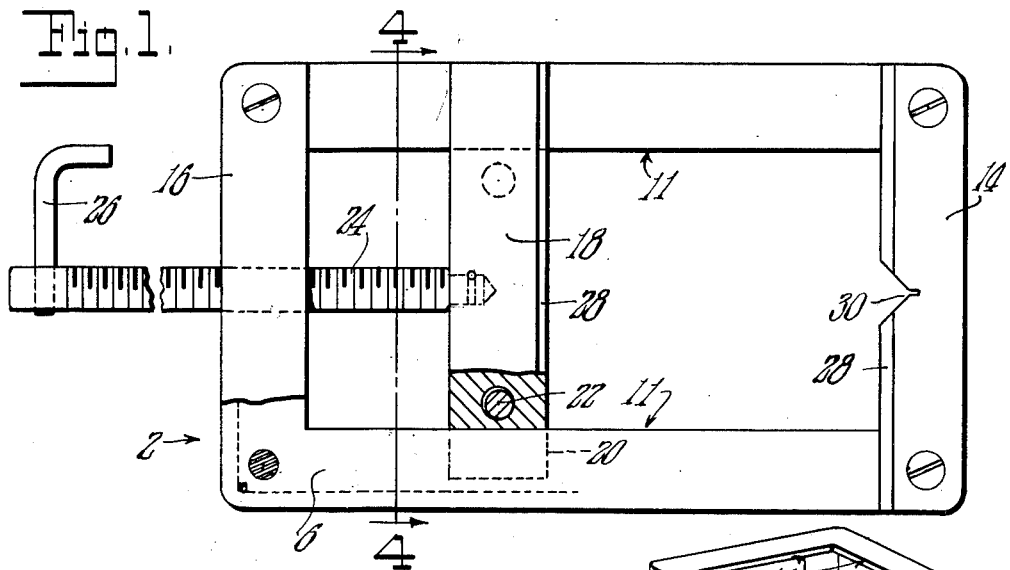
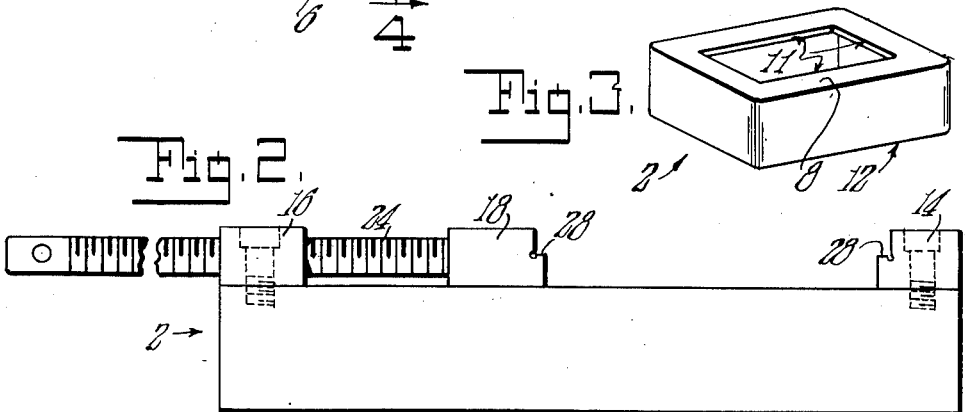
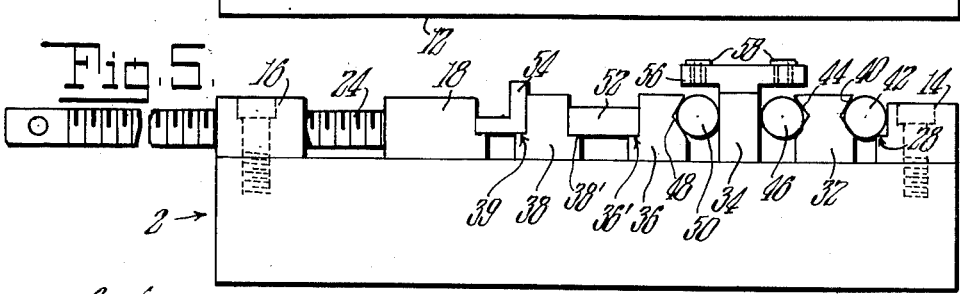
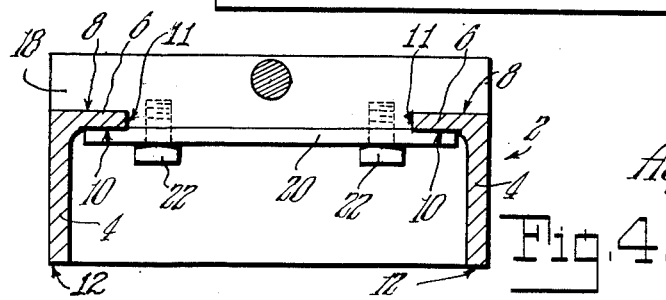
INVENTOR.
Alfred E. Gaudreau
BY
Ross & Ross Patented June 30, 1953

2,643,563

UNITED STATES PATENT OFFICE 2,643,563

SCREW-OPERATED VISE CONSTRUCTION

Alfred E. Gaudreau, Springfield, Mass.

Application April 7, 1950, Serial No. 154,561

1 Claim. (Cl. 81—33)

This invention relates to improvements in vise construction.

The principal objects of this invention are the provision of a vise which is relatively light in weight, rugged and strong in construction and efficient in operation as well as being economical to produce.

According to one novel feature of the invention, the vise frame or base is formed from a length of a preformed member which in cross section is of L shape and will preferably be of steel.

The preformed member is bent into the shape of a rectangle with ends secured together in some suitable manner as by welding or the like. Otherwise the rectangular base or frame may be formed from two or more preformed portions suitably secured together.

The base formed from a preformed member is not only rugged and relatively light in weight but the member employed will be of steel wherefor said member may be bent to the shape desired and when desired or necessary may be heat treated. Also very little machining of the base is required as distinguished from a casting and the material lends itself to grinding operations where precision is desired.

The material cost of the base is much less than is the case with a casting and much machining being obviated the cost of the vise is greatly reduced.

According to another feature of the invention is the provision of a plurality of intermediate clamping members between which and the stationary and movable jaw of the vise various pieces of work may be clamped. That is, a plurality of different work pieces of different shapes may be simultaneously clamped in the vise structure for various machining operations such as drilling, boring, tapping, splining or the like. All or a large number of the components of a structure may be simultaneously clamped for various machining operations so that they may be completed for assembly at low cost.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Figs. 1 and 2 are plan and side elevational views of a vise structure embodying the novel features of the invention;

Fig. 3 is a small scale perspective view of the base of the vise;

Fig. 4 is a sectional view on the line 4—4 of Fig. 1; and

Fig. 5 is a view similar to Fig. 2, but shows the intermediate clamp members of the vise construction.

Referring now to the drawings more in detail, the invention will be fully described.

A base or frame 2 is provided which is rectangular in shape. Said base is formed from a preformed member which in cross section is of L shape having a side leg 4 and a foot 6.

The sides and ends of the base 2 may be shaped by bending the L-shaped member and securing the opposite ends thereof together by any suitable means as by welding or the like.

Otherwise the base may be formed by shaping more than one piece from the preformed material and securing their ends together. The base being formed by shaping preformed members and so as to have sides and ends, the base is very rugged and stiff and is not likely to be injured should it be accidentally dropped.

The base thus formed is light in weight as distinguished from a casting but is relatively more rugged and requires very little machining compared to a casting. That is, the base is machined only on upper and lower sides of the foot at 8 and 10, edges 11 and lower end of the leg at 12.

Preferably the preformed material employed will be of steel which when required may be heat treated and as well lends itself to grinding operations.

A stationary jaw 14 is disposed on the upper side of the foot 6 at one end of the base and is secured thereto by any suitable means. A strut 16 is disposed on the foot 6 at the opposite end of the base by screws, bolts, or the like.

A movable jaw 18 is slidable on the upper side of the foot 6 at opposite sides of the base. A retainer 20 below the foot of the base is secured to the underside of jaw 18 by suitable means such as bolts, screws or the like 22. The parts are fitted so that the jaw 18 is freely slidable without undue play.

A threaded spindle 24 is in threaded engagement with the strut 16 and has its inner end operably connected to the movable jaw 18. A manually engageable member 26 is provided on the outer end of the spindle for rotating the same.

As the spindle is rotated in one direction, jaw 18 is moved towards jaw 14 for clamping a work piece therebetween. To release a work piece clamped between the jaws the spindle is rotated in an opposite direction.

The jaws 14 and 18 may be provided with steps 28 for supporting work and the jaw 14 and/or jaw 18 may be provided with an angular seat such as 30 for receiving a work piece.

As will be seen, the frame being formed from preformed material and requiring little machining the base is not only rugged and light in weight but production costs are at a minimum. At the same time, the base is stiff not only to support the work but withstands the clamping action.

A plurality of intermediate clamp members are provided. These are indicated by 32, 34, 36 and 38.

These members may take various forms, are arranged for movement on the base and may have retainers secured thereto such as is shown in connection with jaw 18.

The member 32 may have an angular seat 40 for cooperating with the step 28 for holding a cylindrical piece 42. There may be an angular seat 44 on the other side of member 32 which cooperates with a side of member 34 for clamping a piece 46. The member 36 may have a seat 48 which cooperates with a side of member 34 for clamping a piece 50.

Member 38 and an adjacent side of member 36 may have steps 36' and 38' for supporting and clamping a work piece 52. A side of member 38 may have a step 39 for cooperating with jaw 18 to support and hold a piece of work 54.

The members shown and described are illustrative only and they may be of any form desired. Said members are readily slidable on the base in such a manner as to float thereon whereby work pieces of various sizes and shapes may be supported and clamped therebetween as the movable jaw 18 is moved towards the fixed jaw 14. In a way, the said members are self-adjusting for the work clamping function.

If desired, one or more of the said intermediate members may carry tool guide means for drilling, boring, reaming, tapping or the like. As an example, a guide 56 is carried by 34 having one or more drill bushings 58.

The form of the intermediate members will be such as to accommodate the pieces of work desired and for the specific operations such as drilling, milling, planing, splining, boring, tapping and the like all to the end that a plurality of work pieces may be produced quickly, efficiently and economically.

Said intermediate members may be provided with seats of various forms and with various steps all as may be desired to adapt the construction for a wide range of uses.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A vise construction comprising in combination, a unitary base including secured together opposite and adjacent longitudinal side and transverse end members each having vertical legs and upper inwardly extending horizontal foot portions, said foot portions having coplanar upper horizontal supporting faces, a transverse stationary jaw secured to the upper face of the foot of one said end member and having an inner clamping face, a transverse strut secured to the upper face of the foot of the other end member, a transverse movable jaw slidable on the upper faces of the feet of the side members and having an inner vertical transverse clamping face, means guiding said jaw in straight line movements between said stationary jaw and strut, a threaded spindle threadedly engaging the strut and being operatively connected to said movable jaw, and a plurality of elongated intermediate jaws separate from and slidable on the upper faces of the feet of the side members between the stationary and movable jaws and each having opposite elongated vertical clamping faces, whereby work pieces between adjacent clamping faces of the stationary and movable and separate jaws may be clamped by moving the movable jaw towards the stationary jaw.

ALFRED E. GAUDREAU.

References Cited in the file of this patent

UNITED STATES PATENTS

| Number | Name | Date |
|---|---|---|
| Re. 22,641 | Barnes | May 15, 1945 |
| 575,685 | Brockett | Jan. 26, 1897 |
| 838,705 | Fuller | Dec. 18, 1906 |
| 987,180 | Smith | Mar. 21, 1911 |
| 1,071,289 | Bader | Aug. 26, 1913 |
| 1,823,537 | Gaudreau | Sept. 15, 1931 |
| 2,418,234 | McCullough | Apr. 1, 1947 |